R. S. MEARS.
GRID FOR BATTERY PLATES.
APPLICATION FILED FEB. 8, 1917.
1,240,076.
Patented Sept. 11, 1917.
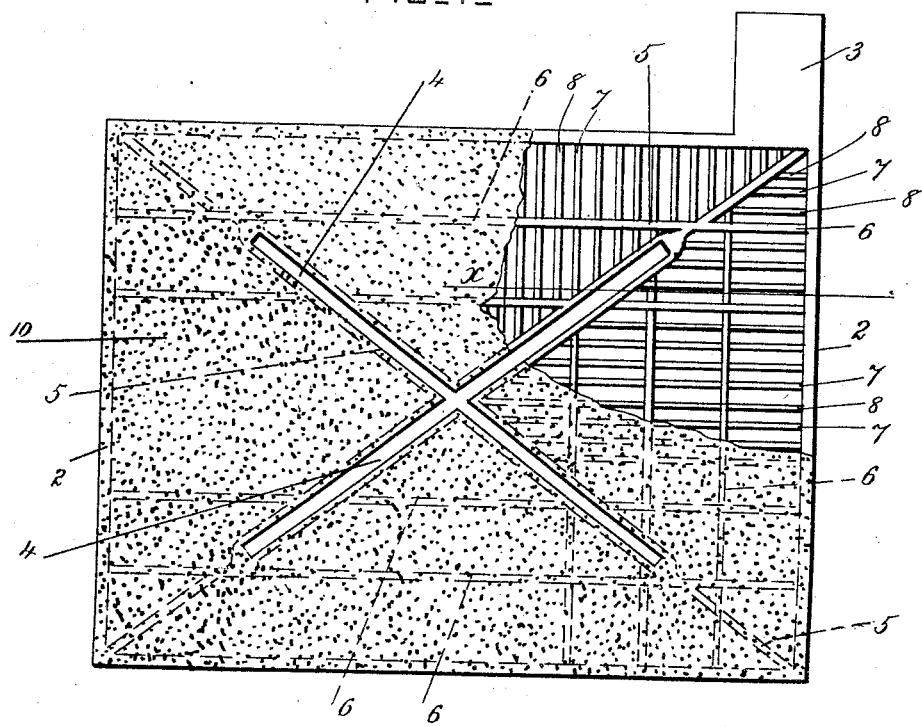
FIG_1_
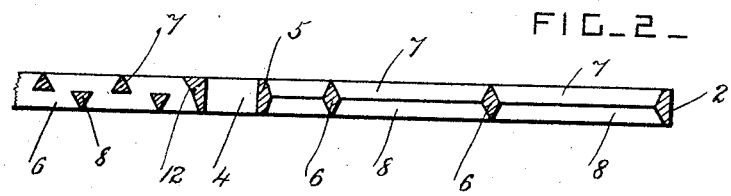
FIG_2_
Inventor
Robert S. Mears
by Herbert H. P. Jenner
Attorney

UNITED STATES PATENT OFFICE.

ROBERT S. MEARS, OF ARKANSAS CITY, KANSAS.

GRID FOR BATTERY-PLATES.

1,240,076.  Specification of Letters Patent.  Patented Sept. 11, 1917.

Application filed February 8, 1917. Serial No. 147,313.

*To all whom it may concern:*

Be it known that I, ROBERT S. MEARS, a citizen of the United States, residing at Arkansas City, in the county of Cowley and State of Kansas, have invented certain new and useful Improvements in Grids for Battery-Plates; and I do hereby declare the following to be a full, clear, and exact description of the invention, such as will enable others skilled in the art to which it appertains to make and use the same.

This invention relates to the grids for the plates of secondary batteries; and it consists of the novel features of construction hereinafter fully described and claimed whereby the active material is supported and whereby the tendency of the plates to buckle is overcome.

In the drawings, Figure 1 is a side view of a battery plate constructed according to this invention showing portions of the active material removed. Fig. 2 is a cross-section taken on the line *x—x* in Fig. 1 and drawn to an enlarged scale, and showing also the preferred arrangement and cross-sections of the supporting bars 6, 7 and 8.

The grid is formed of metal and is preferably rectangular in form, its outer part or frame being formed of strong bars 2, and an arm or conductor 3 being formed at one corner and projecting upwardly. Cross-shaped slots 4 are formed in diagonal bars 5 which extend between the angles of the frame so that the slots 4 radiate from the center part of the grid and divide it into four triangular panels. Each panel has a series of parallel inner bars 6 arranged between the diagonal bars 5 and parallel to the outer bar 2 of the frame which pertains to it. Each panel is also provided with two series of supporting bars 7 and 8 which are arranged at a right angle to its bars 2 and 6. The supporting bars may be varied in arrangement and in cross-section in carrying out this invention, but the arrangement shown in Fig. 2 is preferred.

These bars 7 and 8 are arranged alternately upon opposite sides of the grid, and each bar is triangular in section. One apex of each bar 7 and 8 is arranged to project outwardly in the grid, and its side which is opposite to the said apex is arranged at the center plane of the grid, so that the bars 7 and 8 are in staggered relation. The inner bars 6 are preferably of trapezoidal cross-section. The supporting bars are stiffened in some places at their junctions, as shown at 12 in Fig. 2, it being desirable to do this to make the metal flow more easily in the mold.

The active material 10 is of any approved material or composition, and it is supported in the spaces between the bars of each panel, leaving the cross-shaped slots 4 open. The cross-shaped slots may extend to within any desired distance in the angles of the frame, but they need not extend to the apices of its angles or corners in order to relieve the plate of its tendency to buckle.

What I claim is:

1. A grid for a battery plate, consisting of a frame comprising outer bars, diagonal bars having slots which radiate from the center portion of the grid, and supports for the active material arranged in the spaces or panels of the frame formed by the said outer and diagonal bars.

2. A grid for a battery plate, consisting of a rectangular frame comprising outer bars, diagonal bars having slots which radiate from the center portion of the grid toward the angles of the frame and which divide the grid into triangular panels, and supports for the active material arranged in the said panels.

3. A grid for a battery plate, consisting of a rectangular frame comprising outer bars, bars arranged crosswise of each other and extending between the angles of the frame and provided with slots which meet at the center portion of the grid, and supports for the active material arranged in the panels of the frame between its said bars and leaving the said slots open to each other and unobstructed.

4. A grid for a battery plate, consisting of a rectangular frame comprising outer bars, diagonal bars having slots which radiate from the center portion of the grid and divide it into triangular panels, a series of inner bars arranged in each panel parallel to the outer bar pertaining to it, and supporting bars for the active material arranged in each said panel at a right angle to its inner and outer bars.

5. A grid for a battery plate, consisting of a rectangular frame comprising outer bars, diagonal bars having slots which radiate from the center portion of the grid and divide it into triangular panels, a series of inner bars arranged in each panel parallel to the outer bar pertaining to it, and supporting bars for the active material arranged in each said panel at a right angle to its inner and outer bars, said supporting bars being triangular in cross-section and being arranged alternately in staggered relation upon opposite sides of the center plane of the grid with one angle of each bar projecting outwardly.

In testimony whereof I have affixed my signature.

ROBERT S. MEARS.